United States Patent [19]

Niki

[11] 4,448,152
[45] May 15, 1984

[54] APPARATUS FOR REARING SMALL ANIMALS

[76] Inventor: Motohiro Niki, 22-11, Yushima 2-Chome, Bunkyo-Ku, Tokyo-To, Japan

[21] Appl. No.: 415,191

[22] Filed: Sep. 7, 1982

[30] Foreign Application Priority Data

Jun. 4, 1982 [JP] Japan .................................. 57-94886

[51] Int. Cl.³ .............................................. A01K 31/04
[52] U.S. Cl. ...................................................... 119/22
[58] Field of Search ........................ 119/22, 17, 21, 19

[56] References Cited

U.S. PATENT DOCUMENTS

| | | | |
|---|---|---|---|
| 3,343,522 | 9/1967 | Biehl | 119/22 |
| 3,604,396 | 9/1971 | Radach | 119/22 |
| 3,707,141 | 12/1972 | Boer et al. | 119/22 |
| 3,768,443 | 10/1973 | Keen et al. | 119/22 |
| 3,783,443 | 1/1974 | Siciliano | 119/22 |

Primary Examiner—Robert Peshock
Assistant Examiner—Kris R. Schulze
Attorney, Agent, or Firm—Ladas & Parry

[57] ABSTRACT

An apparatus for rearing small animals comprises a main structure having rearing spaces disposed one above another and having respective inclined floors, and a nozzle unit is disposed alongside the main structure so as to undergo reciprocation along the same. The nozzle unit carries a plurality of nozzles for ejecting cleaning water toward the respective floors and onto filth scraping blades, which are secured to the nozzle unit and are slidable on the floors, to wash away filth scraped off the floors by the scraping blades, whereby the scraping and washing away of the filth are carried out concurrently. Thus cleaning of the floors is carried out automatically after initial adjustments have been made.

5 Claims, 6 Drawing Figures

FIG. I

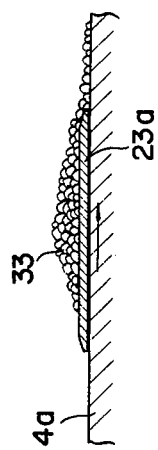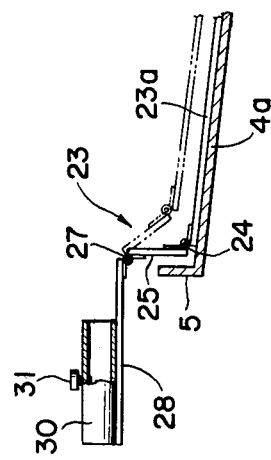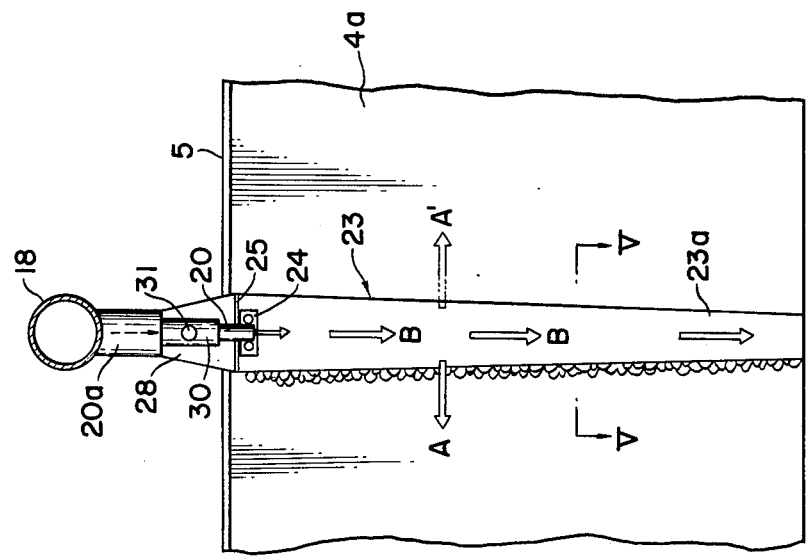

APPARATUS FOR REARING SMALL ANIMALS

BACKGROUND OF THE INVENTION

This invention relates generally to apparatuses for rearing small animals, such as rats or mice, and more particularly to an apparatus of this kind having an automatic cleaning device.

An apparatus for rearing small animals, such as mice, generally includes a main structure having a plurality of rearing spaces disposed one above another for the purposes of reducing rearing labor and effective use of space. It is common with a rearing apparatus of this type to slope the floor of each rearing space in front-to-rear direction of the structure for easy cleaning thereof by flushing away foul matter such as excrement of the animals and spilled feed, which will hereinafter be referred to collectively as "filth".

In the conventional method of cleaning a rearing apparatus of this type, an operator cleans the floor of each rearing space with water running out from one end of a hose manually held by the operator and connected to a water supply source at the other end thereof, thereby washing away filth, making use of the slope of the floor.

This method is very labor- and time-consuming for the cleaning, and this is all the more true especially in the case of cleaning floors of great length. When the water pressure is low or there is a large amount of filth, the water supplied from a hose cannot wash away the filth with its force, and therefore a broom or a scraping tool must be used to discharge the filth outside of the apparatus.

SUMMARY OF THE INVENTION

An object of this invention is to provide an apparatus for rearing small animals in which reliable and automatic removal of the filth from the floors of the rearing spaces to clean the same is accomplished without manual labor except for initial adjustments.

The apparatus for rearing small animals of this invention has a nozzle unit and filth scraping blades for cleaning a plurality of rearing spaces for small animals. The nozzle unit is disposed at one side of the main structure of the rearing apparatus and is so supported as to be movable reciprocatingly in the horizontal direction along the main structure. The nozzle unit has a plurality of nozzles for respective floors of the rearing spaces for ejecting cleaning water thereonto. The filth scraping blades are each in the shape of a strip of thin plate and are attached at their proximal ends to the nozzle unit immediately below the respective nozzles. The scraping blades are placed in close contact with the upper surfaces of the respective floors so as to extend transversely to the moving direction thereof. With the above stated construction, the cleaning water ejected from the nozzles flows along the lengths of the filth scraping blades to wash away filth which has been scraped off the floors by the scraping blades and accumulated thereon, whereby concurrent scraping and washing away of the filth are carried out.

This invention will now be described in more detail with reference to the drawings.

BRIEF DESCRIPTION OF THE DRAWINGS

In the drawings:

FIG. 4 is a plan view, partly in horizontal section, of the members shown in FIG. 3;

FIG. 5 is a sectional view taken along the line V—V of FIG. 4; and

FIG. 6 is a fragmentary right side elevation, partly in section, of the filth scraping device.

DETAILED DESCRIPTION OF THE INVENTION

Figure 1:
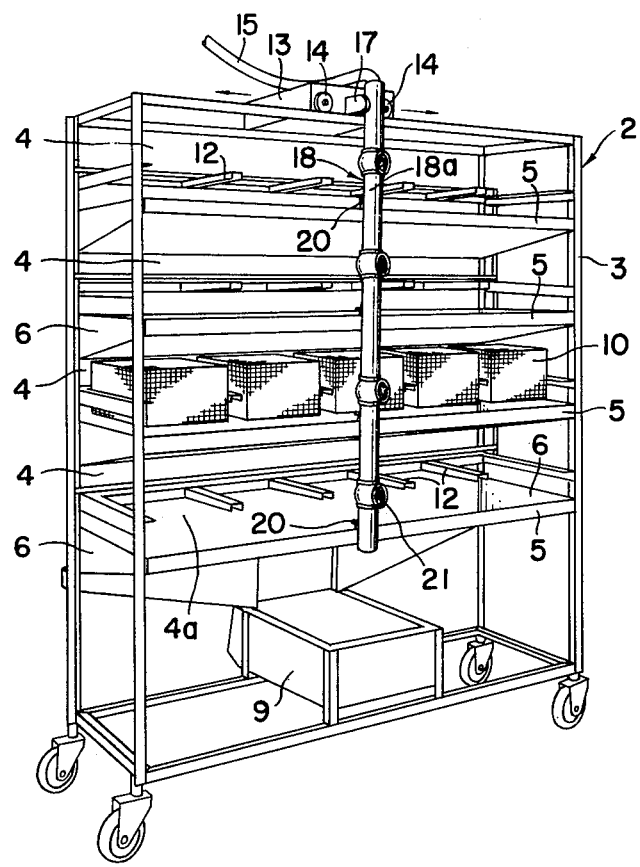
FIG. 1 is a perspective view of one example of the apparatus for rearing small animals of this invention as viewed from the front-left side thereof.
Figure 2:
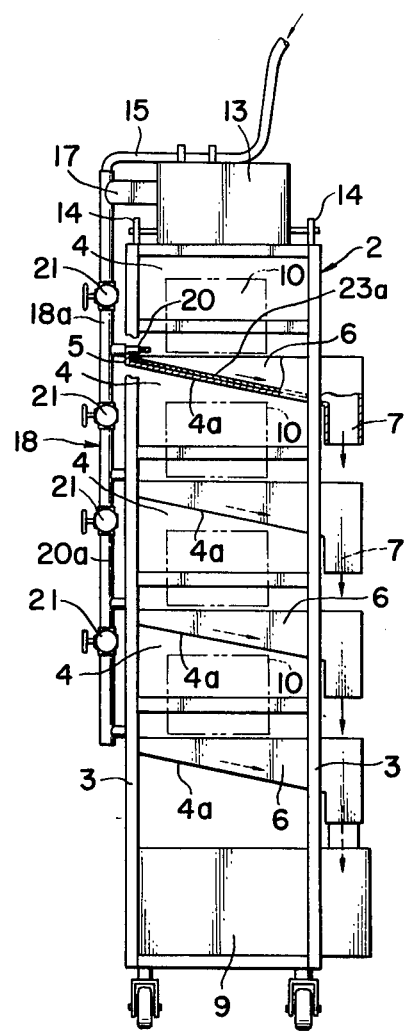
FIG. 2 is a right side elevation, with a part in vertical section, of the same rearing apparatus of this invention.

Referring to FIGS. 1 and 2, the apparatus for rearing small animals shown therein has a main structure 2 including a frame 3. The frame 3 has a plurality of rearing spaces 4 for small animals, disposed one above another. Each space 4 has a floor 4a sloped in the front-to-rear direction thereof. The nearer side in FIG. 1 or the left side in FIG. 2, is the front side of the main structure 2 of the rearing device. The floor 4a is inclined up toward the front side. The floor 4a, on which the filth of small animals is dropped and cleaning water for washing it away is supplied, has upstanding walls or flanges 5 and 6 formed along the front and side bounding edges thereof. The floors 4a and flanges 5 and 6 are made of metal or plastics and are fixedly attached to the frame 3. Each floor 4a has at the lowest portion thereof a discharge opening 7 through which the filth and the cleaning water flow out. The discharge from the discharge opening 7 of the uppermost floor flows down through the discharge openings 7 of the lower floors together with the discharges thereof into a sewage tank 9 disposed on the lowest stage.

Each of the rearing spaces 4 accommodates cages 10. Ordinarily one space 4 houses a plurality of cages. The cages 10 are not placed directly on the floors 4a of the sapces but, as shown in FIG. 1, on cage support brackets 12 projecting horizontally above the floors and into the spaces 4 from the rear side of the frame 3 toward the front side thereof, whereby there is defined a space between the upper surface of each floor 4a and the bottoms of the cages 10 thereabove. The filth of the small animals in the cages passes down through openings in the bottoms of the cages 10 to accumulate on the floors 4a. The filth accumulated thereon in such a manner must be scraped off and washed away periodically.

To this end, the rearing apparatus of this invention is provided with a mechanism as described below.

A carriage 13 is supported on the top of the frame 3 in a manner such that it is movable reciprocatingly in the left-to-right direction of the frame 3. The carriage 13 has a drive motor therein and is moved on wheels 14 along the top of the frame 3.

Figure 3:
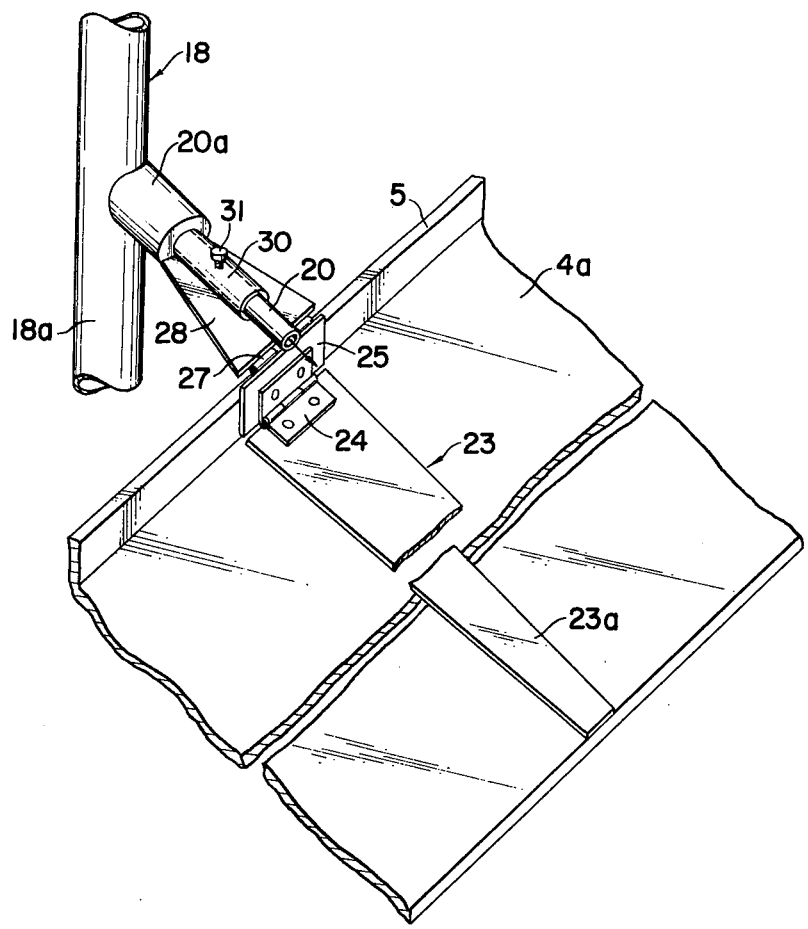
FIG. 3 is a perspective view showing a nozzle and an associated filth scraping device.

The carriage 13 supports a flexible hose 15, which is connected at its upstream end to a water supply source and at its downstream end to the top end of a vertical header pipe 18a of a nozzle unit 18. This header pipe 18a is fixedly supported at the top end thereof by a bracket 17 fixed to the carriage 13 and is closed at the bottom end. Nozzles 20 are projected horizontally from the header pipe 18a at spaced-apart positions intermediate between the top and the bottom ends thereof. These positions are at heights suitable for cleaning respective floors 4a of the rearing spaces 4 as described hereinafter. Valves 21 are provided in the header pipe 18a above respective nozzles 20. According to the embodiment of the invention shown, each nozzle 20, as shown in FIG. 3, is disposed at the end of a short pipe 20a of an enlarged diameter connected integrally to and projecting from the header pipe 18a. Each nozzle 20 projects toward the rear at a height somewhat above its corresponding floor 4a.

Below each nozzle 20, there is provided a filth scraping device 23 having a filth scraping blade 23a in the shape of a strip of thin metal plate. As clearly shown in FIGS. 3 and 4, the filth scraping blade 23a is disposed in the front-to-rear direction of the floor 4a. In the embodiment shown in FIGS. 3 and 4, the scraping blade 23a is narrowed toward the distal end thereof. The filth scraping blade 23a is pivotally connected at the proximal end thereof to one edge (lower edge) of an intermediate member 25 by means of a hinge 24. The other or upper edge of the intermediate member 25 is pivotally connected by a hinge 27 to the front end of a base plate 28, which is a part of the filth scraping device 23. A sleeve 30 is fixedly mounted in the front-to-rear direction on the base plate 28, and a set-screw 31 is provided through the sleeve 30.

Each filth scraping device 23 is secured to the nozzle unit 18, as shown in FIGS. 3 and 4, by fitting its sleeve 30 onto a respective one of the nozzles 20 and tightening the set-screw 31. The base plate 28 is positioned higher than the flange 5 in order to clear the same.

In unison with the reciprocating movement of the carriage 13 along the top of the frame 3, the nozzle unit 18 and the filth scraping members 23a also move reciprocatingly. During this reciprocal movement, the filth scraping blades 23a move in the directions indicated by arrows A and A' in FIG. 4, sliding along the upper surfaces of the floors 4a. Consequently, as shown in FIG. 5, the filth scraping blades 23a scrape the filth off the floors 4a and onto the upper surfaces of the filth scraping blades 23a.

During the reciprocating movement of the filth scraping blades 23a, water is supplied into the header pipe 18a through the flexible hose 15 and ejected through the nozzles 20 onto and along the upper surfaces of the filth scraping members 23a in the direction indicated by arrow B in FIG. 4. The filth on the filth scraping blades 23a is therefore washed away into the discharge openings 7 and flows into the sewage tank 9. In this manner the automatic scraping of the filth and washing away the same take place concurrently.

The inclination and the heights of the floors 4a vary with the type of the apparatus. The intermediate member 25 is provided to adapt the filth scraping blade 13a to varying inclination and height of the floor 4a. As indicated by the chain lines and the solid lines in FIG. 6, the filth scraping blade 23a can be adjusted to be in close contact with floors 4a of different inclination and height by causing the intermediate member 25 to assume a suitable angle of inclination.

The valves 21 shown in FIG. 2 are adjusted as desired so that water can be ejected at equal flow rate from all nozzles 20. Without the valves 21, the lowest nozzle 20 would eject water at the highest flow rate.

As described above with respect to a preferred embodiment of the invention, the filth scraping blades sliding along the floors of the rearing spaces scrape the filth on the floors, while water is ejected onto the upper surfaces of the filth scraping blades, on which the scraped filth is deposited, to wash the filth away. Thus this invention affords an advantage in that the scraping of the filth and the washing away of the same take place concurrently without manual labor except for initial adjustments.

What I claim is:

1. An apparatus for rearing small animals comprising:
   a main structure having elongated rearing spaces for small animals, said spaces being disposed one above another and having respective elongated floors each so inclined transversely thereof that one longitudinal side thereof is higher than the other longitudinal side;
   a nozzle unit disposed on the same side of the main structure as said one longitudinal side, said nozzle unit having a plurality of nozzles arranged to eject cleaning water onto said one longitudinal sides of the respective floors transversely thereto, said nozzles being provided at heights corresponding to those of the respective floors;
   means for moving the nozzle unit reciprocatingly in the horizontal direction along said side of the main structure; and
   filth scraping strip blades placed flat on and in close contact with the upper surfaces of the respective floors and extending transversely thereto, each of the filth scraping blades being connected at one end thereof to the nozzle unit immediately below a respective one of the nozzles so that the cleaning water ejected from the nozzle flows down the upper surface of the filth scraping blade, whereby each filth scraping member slides reciprocally on and along the floor of the rearing space synchronously with the nozzle unit.

2. An apparatus for rearing small animals according to claim 1 wherein each of the filth scraping blades is pivotally connected at said one end to one edge of an intermediate member which is pivotally connected to the nozzle unit at the other edge thereof.

3. An apparatus for rearing small animals according to claim 1 or 2 wherein said means for moving the nozzle unit is a carriage mounted movably on the top of the main structure and carrying the nozzle unit.

4. An apparatus for rearing small animals according to claim 3 wherein said nozzle unit comprises a vertical header pipe depending from the carriage and carrying said nozzles at intervals.

5. An apparatus for rearing small animals according to claim 1 wherein the filth scraping blades are connected to the nozzle unit detachably.

* * * * *